(12) United States Patent
Colmagro et al.

(10) Patent No.: US 11,840,347 B2
(45) Date of Patent: Dec. 12, 2023

(54) ASSEMBLY COMPRISING A TRANSLATIONALLY AND ROTATIONALLY IMMOBILE LINK AXIS, ENGINE ATTACHMENT OR AIRCRAFT COMPRISING SUCH AN ASSEMBLY

(71) Applicant: Airbus Operations SAS, Toulouse (FR)

(72) Inventors: Jérôme Colmagro, Toulouse (FR); Paolo Messina, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 360 days.

(21) Appl. No.: 17/114,703

(22) Filed: Dec. 8, 2020

(65) Prior Publication Data

US 2021/0269167 A1  Sep. 2, 2021

(30) Foreign Application Priority Data

Dec. 10, 2019  (FR) ..................................... 1914097

(51) Int. Cl.
*F16C 11/04* (2006.01)
*B64D 27/26* (2006.01)
*B64F 5/10* (2017.01)

(52) U.S. Cl.
CPC ............... *B64D 27/26* (2013.01); *B64F 5/10* (2017.01); *F16C 11/045* (2013.01); *B64D 2027/268* (2013.01); *Y10T 403/32909* (2015.01)

(58) Field of Classification Search
CPC ..... Y10T 403/32893; Y10T 403/32909; Y10T 403/32918; Y10T 403/32861;

(Continued)

(56) References Cited

U.S. PATENT DOCUMENTS 2,967,726 A * 1/1961 Weston .................... E02F 9/006
                                                   403/157
4,243,341 A * 1/1981 Kabay .................... F16C 35/061
                                                   414/723

(Continued)

FOREIGN PATENT DOCUMENTS

FR    2 862 357   *  5/2005  .............. F16B 21/00
FR    3014971 A1    6/2015
FR    3077560 A1    8/2019

OTHER PUBLICATIONS

French Search Report; priority document.

*Primary Examiner* — Michael P Ferguson
(74) *Attorney, Agent, or Firm* — Greer, Burns & Crain, Ltd.

(57) ABSTRACT

An assembly including a link axis supported by first and second guiding rings positioned in first and second branches of a clevis, one of the guiding rings including a tubular extension, protruding with respect to an outer face of one of the branches, which has a threaded portion on its outer circumferential face. Complementing this, the assembly includes a nut configured to be screwed onto the threaded portion of the tubular extension and an immobilization system configured to immobilize the nut in translation and/or in rotation, the nut and the link axis being linked by a complete link that is non-removable or that forms a single-piece part. This solution makes it possible to reduce the number of parts forming the assembly. Also provided are an engine attachment and an aircraft including such an assembly.

11 Claims, 5 Drawing Sheets

(58) Field of Classification Search
CPC ............... F16B 39/108; F16C 11/045; B64D 2027/266; B64D 2027/268
See application file for complete search history.

(56) References Cited

U.S. PATENT DOCUMENTS

| | | |
|---|---|---|
| 9,399,520 B2 * | 7/2016 | Cassagne .............. F16C 11/045 |
| 9,592,917 B2 * | 3/2017 | Cassagne ............... B64D 27/12 |
| 9,593,708 B2 * | 3/2017 | Cassagne ................ F16C 11/04 |
| 9,828,103 B2 | 11/2017 | Cassagne et al. |
| 10,239,192 B2 * | 3/2019 | Guyomard ............ F16B 39/108 |
| 2015/0167726 A1 | 6/2015 | Cassagne et al. |
| 2019/0241272 A1 | 8/2019 | Geliot et al. |

* cited by examiner

US 11,840,347 B2

ASSEMBLY COMPRISING A TRANSLATIONALLY AND ROTATIONALLY IMMOBILE LINK AXIS, ENGINE ATTACHMENT OR AIRCRAFT COMPRISING SUCH AN ASSEMBLY

CROSS-REFERENCES TO RELATED APPLICATIONS

This application claims the benefit of the French patent application No. 1914097 filed on Dec. 10, 2019, the entire disclosures of which are incorporated herein by way of reference.

FIELD OF THE INVENTION

The present application relates to an assembly comprising a translationally and rotationally immobile link axis and an engine attachment or an aircraft comprising such an assembly.

BACKGROUND OF THE INVENTION

According to a configuration that can be seen in FIGS. 1 and 2, an aircraft 10 comprises several engine assemblies 12 which are positioned under the wings 14 of the aircraft 10.

An engine assembly 12 comprises an engine 16, a nacelle (not represented in FIG. 2) positioned around the engine 16 and a pylon 18 which ensures the link between the engine 16 and the rest of the aircraft 10, notably the wings 14.

The pylon 18 comprises a primary structure 20 which is linked to the engine 16 by a front engine attachment 22, a rear engine attachment 24 and a pair of torque arms 26 which ensure the absorption of the thrust loads.

According to an embodiment that can be seen in FIG. 3, the front engine attachment 22 comprises a plate 28, secured to the pylon 18, which has two clevises 30 disposed on either side of the pylon 18, and two connecting rods 32, which each link one of the clevises 30 of the plate 28 to a clevis 34 secured to a casing of the engine 16. Thus, each connecting rod 32 is linked to one of the clevises 30 of the plate 28 by a first link axis 36 and to one of the clevises 34 of the engine 16 by a second link axis 38.

According to an embodiment that can be seen in FIG. 4 and that is described in detail in the document FR3014971, an assembly between the clevis 34 secured to the engine 16 and the connecting rod 32 comprises a link axis 38 mounted in a first guiding ring 40 inserted into a first branch 34.1 of the clevis 34 and in a second guiding ring 42 inserted into a second branch 34.2 of the clevis 34, the link axis 38 supporting, between the first and second branches 34.1 and 34.2, a ball joint link 44 configured to link the connecting rod 32 and the link axis 38.

The first guiding ring 40 comprises, at a first end, an outer flange ring 40.1 configured to bear against an inner face 34.11 of the first branch 34.1 and, at a second end, a shoulder 40.2 configured to block translation of the link axis 38 in a first direction. The second guiding ring 42 comprises, at a first end, an outer flange ring 42.1 configured to bear against an inner face 34.21 of the second branch 34.2.

The link axis 38 is a cylinder which has an axis A38, a first transverse face 38.1, substantially at right angles to the axis A38, configured to bear against the shoulder 40.2 of the first guiding ring 40 and a second transverse face 38.2 substantially at right angles to the axis A38.

The assembly also comprises a blocking device 46 configured to block translation of the link axis 38 in a second direction which, together with the shoulder 40.2, allows the link axis 38 to be immobilized in translation.

The blocking device 46 comprises:
an extension 48 of the second guiding ring 42 which has a tapped internal bore 48.1 and notches 48.2,
a blocking screw 50 that is screwed into the extension 48 which has a front face 50.1 bearing against the second transverse face 38.2 of the link axis 38 and a rear part 50.2 of hexagonal section allowing the screw 50 to be screwed,
a lock washer 52 comprising an aperture 52.1 which is fitted onto the hexagonal rear part 50.2 of the screw 50 and two diametrically opposed tongues 52.2, which are housed in notches 48.2 of the extension 48 to immobilize the screw 50 in rotation with respect to the extension 48,
an outer elastic stop ring 54 which is housed partially in an annular groove formed in the rear part 50.2 of the screw 50, allowing the lock washer 52 to be immobilized in the notches 48.2 of the extension 48, and
a pin 56 which passes through the extension 48 and the rear part 50.2 of the screw 50 to immobilize the screw 50 in rotation with respect to the extension 48.

This embodiment generates an offset D, with respect to the outer face of the branch of the clevis, significant given the stacking of the lock washer 52, of the outer elastic stop ring 54 and of the pin 56.

The documents FR3077560 and US2019241272 propose a solution that aims to reduce the offset.

However, as is described in the document FR3014971, the solution described in the document FR3077560 comprises a large number of parts, which tends to increase the complexity of assembly and removal.

The present invention aims to remedy all or some of the drawbacks of the prior art.

SUMMARY OF THE INVENTION

To this end, the subject of the invention is an assembly comprising a link axis, a first guiding ring supporting the link axis, positioned in a first branch of a clevis, a second guiding ring supporting the link axis, positioned in a second branch of the clevis, comprising a tubular body and a tubular extension protruding with respect to an outer face of the second branch.

According to the invention, the tubular extension of the second guiding ring comprises an outer circumferential face having a threaded portion. Complementing this, the assembly comprises a nut configured to be screwed onto the threaded portion of the tubular extension of the second guiding ring and an immobilization system configured to immobilize the nut in translation and/or in rotation, the nut and the link axis being linked by a complete link that is not removable or that forms a single-piece part.

The invention makes it possible to obtain an assembly with a reduced number of parts which facilitates the mounting and removal thereof.

According to another feature, the link axis and the nut are linked by at least one weld to obtain a complete non-removable link.

According to a first variant, the nut comprises a transverse wall having an inner face oriented toward a transverse face of the link axis and linked thereto by at least one weld of surface type.

According to one procedure, the weld of surface type is obtained by friction welding.

According to a second variant, the nut comprises an inner flange ring having an inner edge adjacent to the link axis and linked thereto by at least one circumferential weld forming a weld bead extending over at least a part of the circumference of the link axis.

According to one configuration, the circumferential weld extends continuously over all the circumference of the link axis.

According to one procedure, the circumferential weld is obtained by welding using an energy beam.

According to another embodiment, the link axis and the nut are linked by a force-fitting to obtain the complete non-removable link.

According to another feature, the immobilization system comprises a washer with foldable spurs comprising a ring positioned around the tubular extension between the nut and the second branch in operation, first foldable spurs configured to be folded against an outer circumferential wall of the nut in operation and second foldable spurs configured to be folded against a peripheral face of the second branch in operation.

Also, a subject of the invention is an engine attachment or an aircraft comprising an assembly according to one of the above features.

BRIEF DESCRIPTION OF THE DRAWINGS

Other features and advantages will emerge from the following description of the invention, given purely by way of example, in light of the attached drawings in which.

DETAILED DESCRIPTION OF THE PREFERRED EMBODIMENTS

Figure 1:
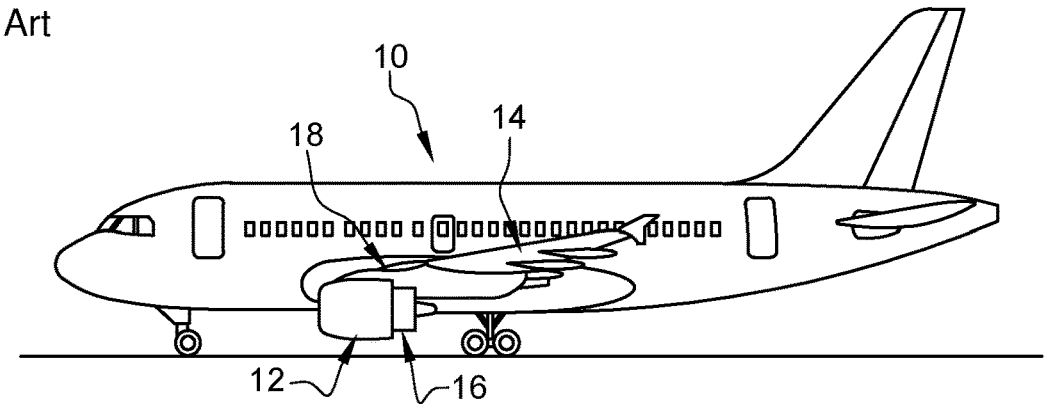
FIG. 1 is a side view of an aircraft of the prior art.
Figure 2:
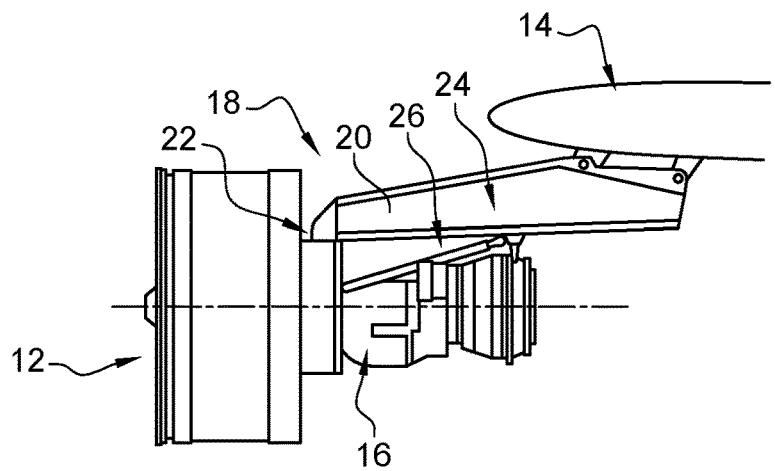
FIG. 2 is a schematic side view representation of a propulsion assembly linked to a wing which illustrates an embodiment of the prior art.
Figure 3:
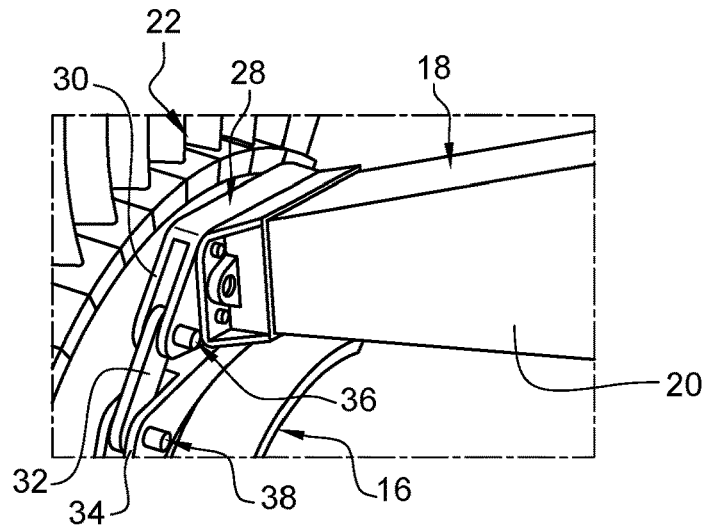
FIG. 3 is a perspective view of a front engine attachment which illustrates an embodiment of the prior art.
Figure 4:
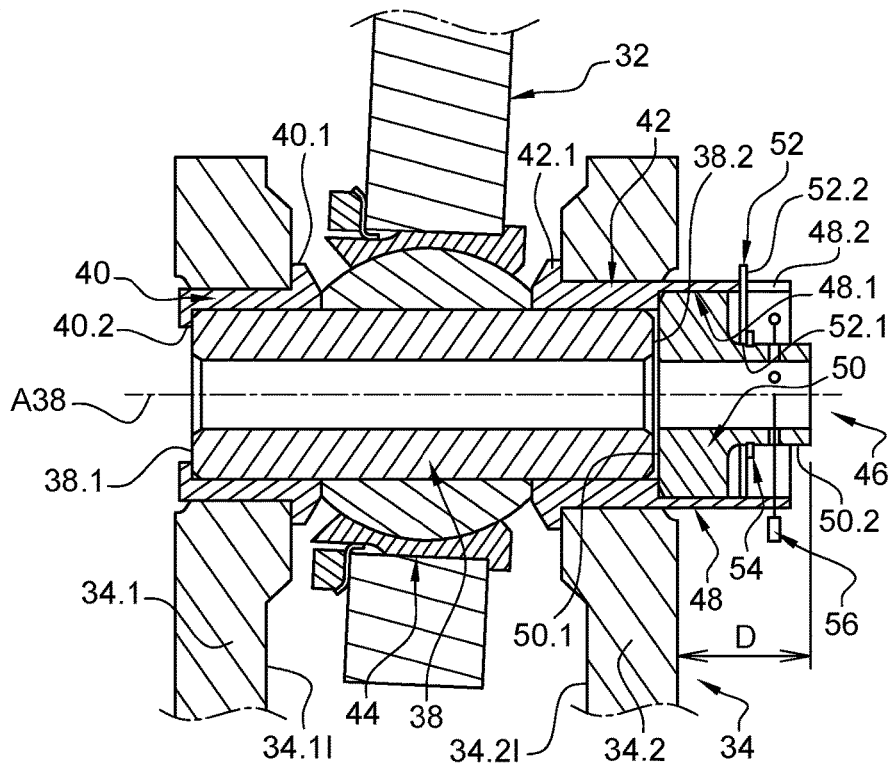
FIG. 4 is a cross-section of an assembly of an engine attachment which illustrates an embodiment of the prior art.
Figure 5:
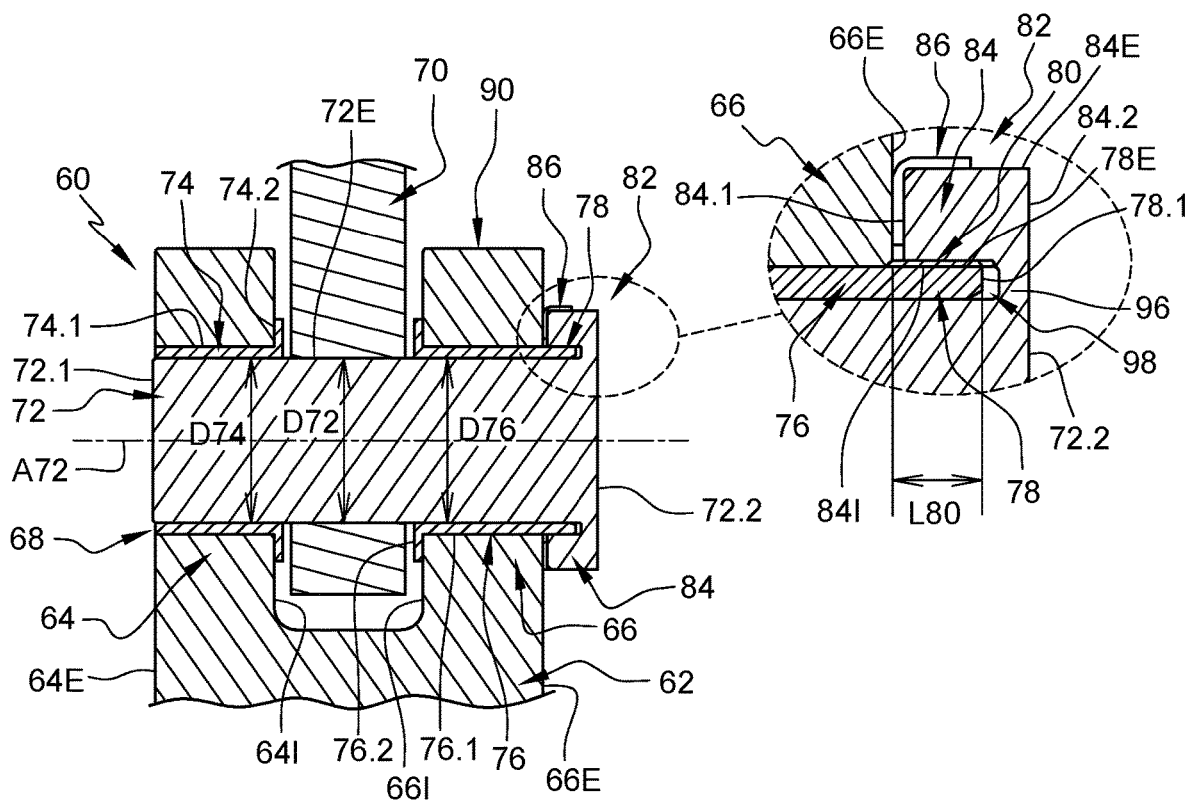
FIG. 5 is a schematic cross-section of an assembly of an engine attachment which illustrates a first embodiment of the invention.

According to an embodiment illustrated in FIG. 5, a part of a front engine attachment 60 comprises a clevis 62, secured to an aircraft engine (or to one of its casings), having first and second branches 64, 66, linked by a link 68 to a connecting rod 70 which is itself linked to a primary structure of an aircraft pylon. The link 68 comprises a link axis 72, which supports, in a central part, a ball joint linking the link axis 72 and the connecting rod 70, and first and second guiding rings 74, 76, disposed on either side of the ball joint, linking the link axis 72 and the branches 64, 66 of the clevis 62.

The first branch 64 comprises an inner face 64I, oriented toward the second branch 66, and an outer face 64E parallel to the inner face 64I. The second branch 66 comprises an inner face 66I, oriented toward the first branch 64, and an outer face 66E parallel to the inner face 66I. According to one configuration, the outer face 64E of the first branch 64 is difficult to access and the link axis 72 is introduced via the outer face 66E of the second branch 66.

The first branch 64 supports the first guiding ring 74 which has a tubular body 74.1 and an outer flange ring 74.2, at a first end of the tubular body 74.1, bearing in operation against the inner face 64I of the first branch 64. The tubular body 74.1 has an internal diameter D74.

The second branch 66 supports the second guiding ring 76 which has a tubular body 76.1, an outer flange ring 76.2, at a first end of the tubular body 76.1, bearing in operation against the inner face 66I of the second branch 66 and a tubular extension 78, in the extension of the tubular body 76.1, protruding with respect to the outer face 66E of the second branch 66. The tubular body 76.1 has an internal diameter D76 substantially identical to the internal diameter D74 of the first guiding ring 74.

The link axis 72 is a cylinder which has an axis A72.

For the rest of the description, a longitudinal direction is a direction parallel to the axis A72 and a radial direction is a direction at right angles to the axis A72. A longitudinal plane is a plane containing the axis A72 and a transverse plane is a plane at right angles to the axis A72. Finally, a surface is said to be circumferential if it extends around the axis A72 and a surface is said to be transverse if it extends in a plane approximately at right angles to the axis A72.

The link axis 72 also comprises a cylindrical circumferential surface 72E, a first transverse face 72.1 substantially at right angles to the axis A72 and a second transverse face 72.2 substantially at right angles to the axis A72.

The link axis 72 has an outer diameter D72 substantially equal to the internal diameters D74, D76 of the first and second guiding rings 74, 76.

Apart from the second guiding ring 76, the other elements of the link 68 can be identical to those of the prior art.

Although described as applied to a front engine attachment 60, the invention is not limited to that application. Thus, the invention can be applied to any assembly comprising a link axis, such as, for example, an assembly between first and second parts of an engine attachment or of a wing attachment, the first part (corresponding to the clevis 62 in FIG. 5) being directly or indirectly linked to the engine, to the primary structure of a pylon or to the wings of the aircraft, the second part (corresponding to the connecting rod 70 in FIG. 5) being directly or indirectly linked to a part of the aircraft different to that to which the first part out of the engine, the primary structure of the pylon or the wing of the aircraft is linked.

The tubular extension 78 of the second guiding ring 76 comprises a transverse rim 78.1 and an outer circumferential face 78E having a threaded portion 80.

The tubular extension 78 and the tubular body 76.1 of the second guiding ring 76 have the same internal diameter.

The threaded portion 80 has a length L80 approximately equal to the length of the tubular extension 78 protruding with respect to the outer face 66E of the second branch 66 when the outer flange ring 76.2 is bearing against the inner face 66I of the second branch 66.

The assembly also comprises a blocking system 82 for blocking translation and rotation of the link axis 72 which comprises a nut 84 that is screwed onto the threaded portion 80 of the tubular extension 78 of the second guiding ring 76, and an immobilization system 86 configured to immobilize the nut 84 in translation and/or rotation.

According to a particular feature of the invention, the nut 84 and the link axis 72 are linked by a complete non-removable link or form a single-piece part such that the nut 84 and the link axis 72 are immobile relative to one another.

According to one embodiment, the nut 84 comprises an outer circumferential wall 84E, an inner circumferential wall 84I, a first transverse face 84.1 oriented toward the second branch 66 in operation and a second transverse face 84.2 opposite the first transverse face 84.1.

The inner circumferential wall 84I has a tapping configured to be screwed onto the threaded portion 80 of the tubular extension 78.

The first and second transverse faces 84.1, 84.2 are approximately at right angles to the axis A72.

The outer circumferential wall 84E of the nut 84 comprises at least one flat 88. According to one configuration, the outer circumferential wall 84E of the nut 84 comprises several flats 88 (that can be seen in FIG. 6) distributed over its circumference. As an example, the outer circumferential wall 84E of the nut 84 has a hexagonal section.

According to one embodiment, the immobilization system 86 comprises a washer with foldable spurs 90 (that can be seen in FIGS. 6 to 9).

Figure 6:
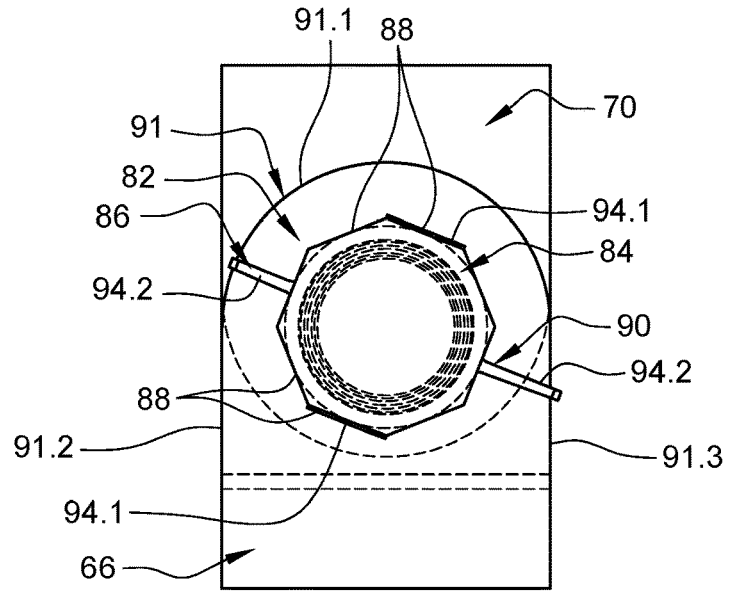
FIG. 6 is a side view of the assembly that can be seen in FIG. 5.

According to a configuration that can be seen in FIG. 6, the second branch 66 comprises a peripheral face 91, linking the outer and inner faces 66E, 66I, comprising a cylindrical portion 91.1 extended on either side by two substantially flat faces 91.2, 91.3.

The washer with foldable spurs 90 comprises a ring 92 in the form of a disk, having an outer edge and a cylindrical inner edge whose diameter is greater than the outer diameter of the tubular extension 78, first foldable spurs 94.1, provided on the outer edge of the ring 92, configured to be folded against the outer circumferential wall 84E of the nut 84 in operation and second foldable spurs 94.2, provided on the outer edge of the ring 92, configured to be folded against the peripheral face 91 of the second branch 66. In operation, the ring 92 of the washer with foldable spurs 90 is inserted between the second branch 66 and the nut 84. According to one configuration, the washer with foldable spurs 90 comprises two second, diametrically opposite foldable spurs 94.2 and two first diametrically opposite foldable spurs 94.1, equidistant from the second foldable spurs 94.2.

Obviously, the invention is not limited to this immobilization system 86 for the nut 84. As a variant or in complement, the immobilization system 86 could comprise a pin passing through the nut 84, the tubular extension 78 and the link axis 72.

According to a first embodiment, the link axis 72 and the nut 84 are of a single piece and produced from a single block of material.

According to this first embodiment, the link axis 72 and the nut 84 are produced by machining, by 3D printing or by any other method.

According to this first embodiment, the second transverse face 72.2 of the link axis 72 and the second transverse face 84.2 of the nut 84 are in the same transverse plane. The block of material forming the link axis 72 and the nut 84 also comprises a transverse wall 96 linking the link axis 72 and the nut 84. Thus, the transverse wall 96, the link axis 72 and the nut 84 delimit a longitudinal groove 98 which extends over all the circumference of the link axis 72, configured to house the tubular extension 78.

Figure 7:
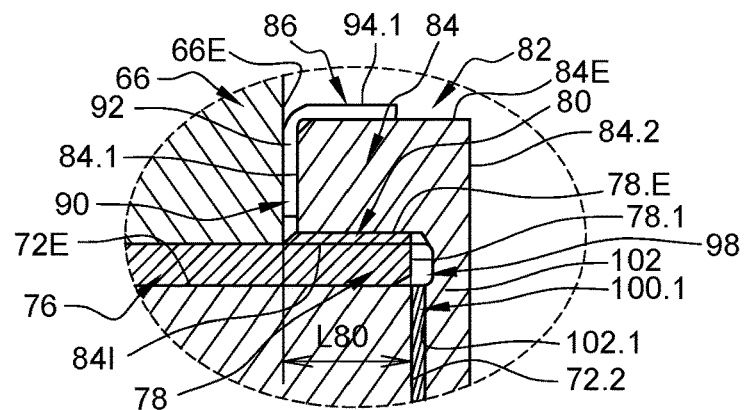
FIG. 7 is a cross-section of a part of an assembly of an engine attachment which illustrates a second embodiment of the invention.
Figure 8:
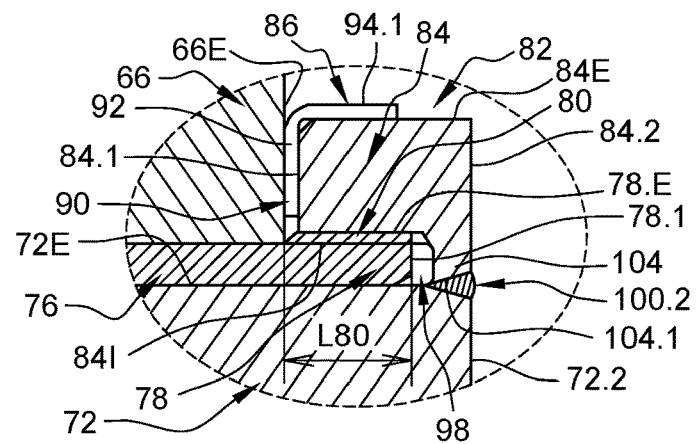
FIG. 8 is a cross-section of a part of an assembly of an engine attachment which illustrates a third embodiment of the invention.
Figure 9:
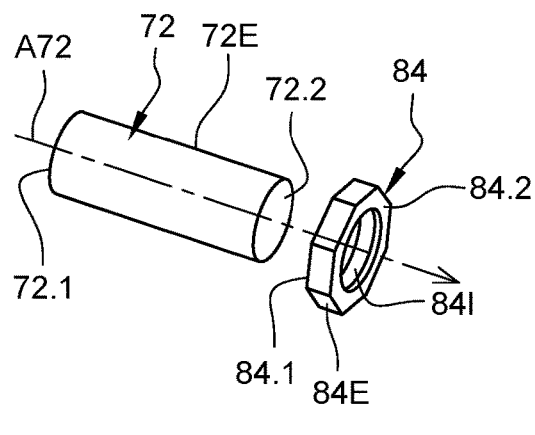
FIG. 9 is a perspective view of a link axis and of a nut before the force-fitting thereof illustrating a fourth embodiment of the invention.
Figure 10:
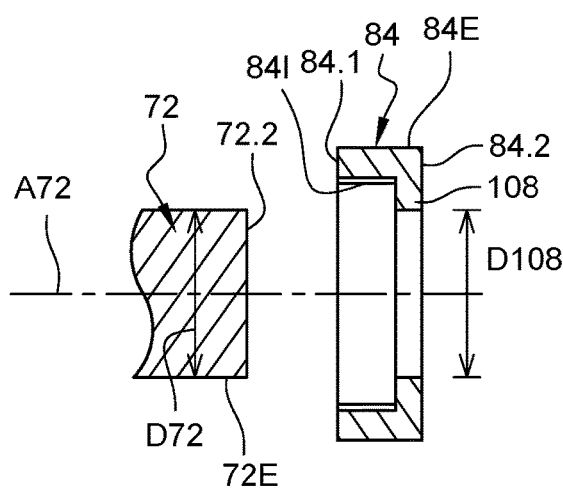
FIG. 10 is a longitudinal cross-section of the link axis and of the nut that can be seen in FIG. 9 before the force-fitting thereof.
Figure 11:
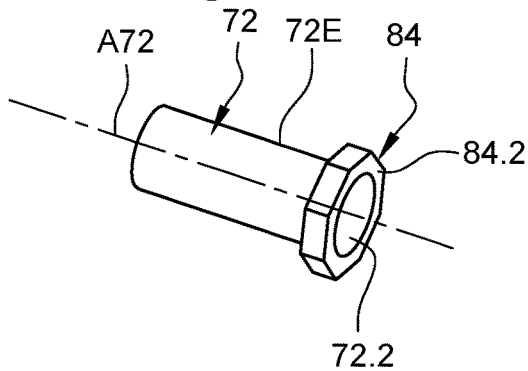
FIG. 11 is a perspective view of the link axis and of the nut that can be seen in FIG. 9 after the force-fitting thereof.
Figure 12:
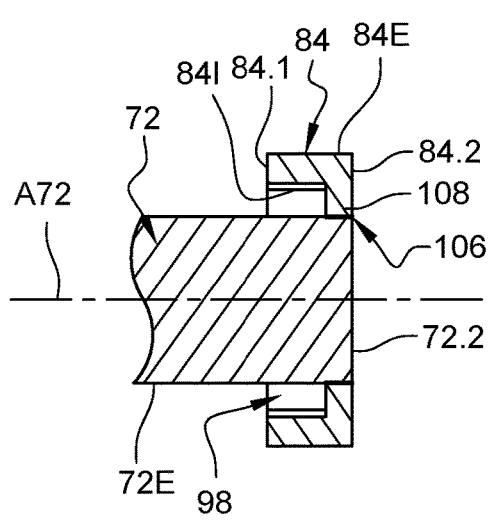
FIG. 12 is a longitudinal cross-section of the link axis and of the nut that can be seen in FIG. 9 after the force-fitting thereof.

According to second and third embodiments that can be seen in FIGS. 7 and 8, the link axis 72 and the nut 84 are linked by at least one weld 100.1, 100.2 so as to be linked by a complete non-removable link.

According to a second embodiment that can be seen in FIG. 7, the nut 84 comprises a transverse wall 102 positioned in the extension of the second transverse face 84.2 of the nut 84, blocking the nut 84 so as to delimit, with the inner circumferential wall 84I, a housing configured to house the end of the link axis 72 and the tubular extension 78 in operation.

The transverse wall 102 has an inner face 102I oriented toward the second transverse face 72.2 of the link axis 72 and linked thereto by at least one weld 100.1 of surface type.

According to one procedure, the weld 100.1 of surface type is obtained by friction welding.

According to a third embodiment that can be seen in FIG. 8, the nut 84 comprises an inner flange ring 104, positioned in the extension of the second transverse face 84.2 of the nut 84, protruding with respect to the inner circumferential wall 84I, having an inner edge 104.1 adjacent to the outer circumferential surface 72E of the link axis 72.

The second transverse face 72.2 of the link axis 72 and the second transverse face 84.2 of the nut 84 being positioned in one and the same plane, the inner edge 104.1 of the inner flange ring 104 of the nut 84 and the outer circumferential surface 72E of the link axis 72 are linked by at least one circumferential weld 100.2 forming a weld bead which extends over at least a part of the circumference of the link axis 72. According to one configuration, the circumferential weld 100.2 extends continuously over the entire circumference of the link axis 72.

According to one procedure, the circumferential weld 100.2 is obtained by welding using an energy beam, such as an electron beam.

According to a fourth embodiment illustrated by FIGS. 9 to 12, the link axis 72 and the nut 84 are linked by a force-fitting 106 so as to obtain a complete non-removable link. According to one procedure, the force-fitting is a cold fitting using liquid nitrogen. To this end, before they are fitted together, the nut 84 comprises an inner flange ring 108, positioned in the extension of the second transverse face 84.2 of the nut 84, protruding with respect to the inner circumferential wall 84I, having an internal diameter D108 slightly smaller than the external diameter D72 of the link axis 72.

According to these various embodiments, the assembly formed by the link axis 72 and the nut 84 comprises an inner flange ring 104, 108 or a transverse wall 96, 102 linking the link axis 72 and the nut 84 so as to delimit a longitudinal groove 98 which extends over the entire circumference of the link axis 72, configured to house the tubular extension 78.

Since the nut 84 and the link axis 72 form a single-piece assembly and the nut 84 is immobilized in translation and in rotation with respect to the clevis 62, the link axis 72 is also immobilized in translation and in rotation with respect to the clevis 62.

The invention also makes it possible to obtain an assembly with a reduced number of parts which facilitates mounting and removal.

Figure 13:
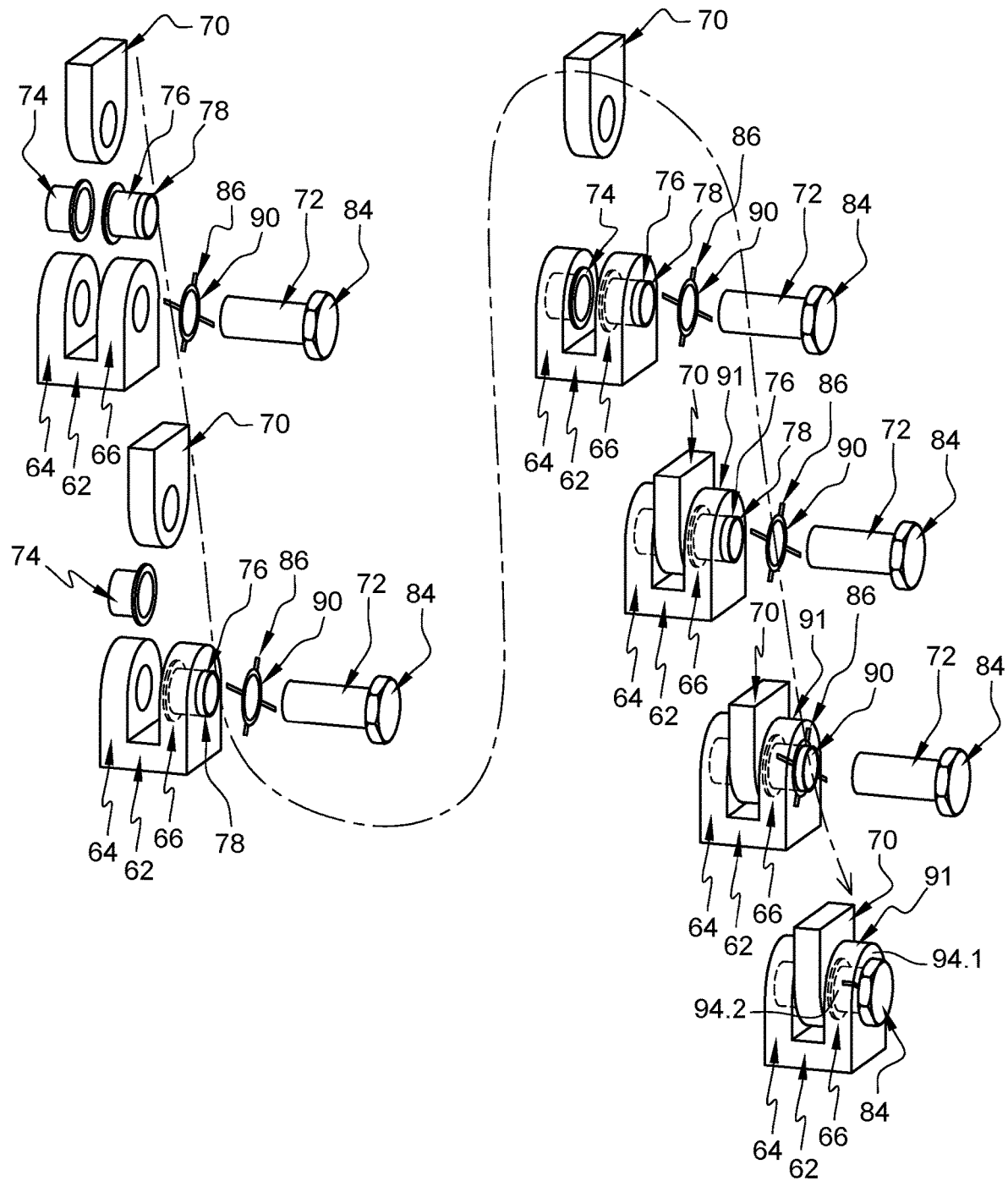
FIG. 13 is a diagram showing the various steps of mounting an assembly of an engine attachment illustrating an embodiment of the invention.

In FIG. 13, a method for mounting the assembly is described.

In a first step, the second guiding ring 76 is inserted into a bore of the second branch 66 and the first guiding ring 74 is inserted into a bore of the first branch 64. The order of insertion of the first and second guiding rings 74, 76 could be reversed. The outer flange rings of the first and second guiding rings 74, 76 bear against the inner faces 64I, 66I of the first and second branches 64, 66. The tubular extension 78 of the second guiding ring 76 protrudes with respect to the outer face 66E of the second branch 66.

In a second step, the connecting rod 70 is positioned between the first and second branches 64, 66.

In a third step, the washer with foldable spurs 90 is positioned around the tubular extension 78.

In a fourth step, the link axis 72 is inserted into the second guiding ring 76, into the connecting rod 70 then into the first guiding ring 74. The nut 84 is screwed onto the tubular extension 78 to the bottom of the thread until there remains only a small space between the second branch 66 and the nut 84, sufficient however to contain the washer with foldable spurs 90.

In a fifth step, the first foldable spurs 94.1 are folded to 90° against the flats 88 of the outer circumferential face 84E of the nut 84 and the second foldable spurs 94.2 are folded against the lateral face 91 of the second branch 66.

Then, the nut 84 and the link axis 72 are immobilized in rotation and in translation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly comprising:
a link axis comprising a cylindrical sidewall,
a clevis having a first branch and a second branch, the cylindrical sidewall of the link axis passing through aligned holes in the first branch and the second branch,
a first guiding ring supporting the link axis positioned in the first branch of the clevis, the first guiding ring having a flange on one end positioned against an inner face of the first branch of the clevis facing an inner face of the second branch and a tubular body terminating at an opposite end of the guiding ring, the tubular body having a diameter greater than a diameter of the cylindrical sidewall of the link axis,
a second guiding ring supporting the link axis, positioned in the second branch of the clevis, comprising a tubular body and a tubular extension protruding with respect to an outer face of the second branch,
wherein the tubular extension of the second guiding ring comprises an outer circumferential face having a threaded portion,
wherein the assembly comprises a nut configured to be screwed onto the threaded portion of the tubular extension of the second guiding ring and an immobilization system configured to immobilize the nut in at least one of translation or in rotation, and
wherein the nut and the link axis have a common axis of rotation and are linked by a complete link comprising a fixed coupling between the nut and a distal end of the link axis that is not removable or that forms a single-piece part, wherein the complete link is formed radially inwardly of a threaded connection between the nut and the tubular extension of the second guiding ring and forms a portion of a groove located between an inner wall of the nut and an outer surface of the link axis, wherein the tubular extension of the second guiding ring is housed within the groove, and wherein rotational movement by the nut is transferred to the link axis.

2. The assembly as claimed in claim 1, wherein the link axis and the nut are linked by at least one weld to obtain the complete non-removable link.

3. The assembly as claimed in claim 2, wherein the nut comprises a transverse wall having an inner face oriented toward a transverse face of the link axis and linked thereto by at least one weld of surface type.

4. The assembly as claimed in claim 3, wherein the weld of surface type is obtained by friction welding.

5. The assembly as claimed in claim 2, wherein the nut comprises an internal flange ring having an inner edge adjacent to the link axis and linked thereto by at least one circumferential weld forming a weld bead extending over at least a part of a circumference of the link axis.

6. The assembly as claimed in claim 5, wherein the circumferential weld extends continuously over all the circumference of the link axis.

7. The assembly as claimed in claim 5, wherein the circumferential weld is obtained by welding using an energy beam.

8. The assembly as claimed in claim 1, wherein the link axis and the nut are linked by a force-fitting to obtain the complete non-removable link.

9. The assembly as claimed in claim 1, wherein the immobilization system comprises:
a washer with first and second foldable spurs comprising a ring positioned around the tubular extension between the nut and the second branch in operation,
the first foldable spurs being configured to be folded against an outer circumferential wall of the nut in operation, and
the second foldable spurs being configured to be folded against a peripheral face of the second branch in operation.

10. An engine attachment comprising an assembly as claimed in claim 1.

11. An aircraft comprising an assembly as claimed in claim 1.

* * * * *